United States Patent
Li et al.

(10) Patent No.: US 11,252,642 B2
(45) Date of Patent: Feb. 15, 2022

(54) METHOD AND DEVICE FOR TRANSMITTING SYSTEM INFORMATION

(71) Applicant: VIVO MOBILE COMMUNICATION CO., LTD., Chang'an DongGuan (CN)

(72) Inventors: Xiaolong Li, Chang'an DongGuan (CN); Fei Qin, Chang'an DongGuan (CN); Chenlu Zhang, Chang'an DongGuan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 16/493,280

(22) PCT Filed: Jan. 31, 2018

(86) PCT No.: PCT/CN2018/074670
§ 371 (c)(1),
(2) Date: Sep. 11, 2019

(87) PCT Pub. No.: WO2018/171336
PCT Pub. Date: Sep. 27, 2018

(65) Prior Publication Data
US 2020/0008133 A1 Jan. 2, 2020

(30) Foreign Application Priority Data

Mar. 23, 2017 (CN) .......................... 201710179204.X

(51) Int. Cl.
*H04W 48/10* (2009.01)
*H04W 74/00* (2009.01)
(52) U.S. Cl.
CPC ......... *H04W 48/10* (2013.01); *H04W 74/006* (2013.01)

(58) Field of Classification Search
CPC ... H04W 48/10; H04W 48/14; H04W 72/005; H04W 74/002; H04W 74/006; H04W 74/0833
See application file for complete search history.

(56) References Cited

U.S. PATENT DOCUMENTS

| | | | |
|---|---|---|---|
| 2018/0192255 A1* | 7/2018 | Guo | ................. H04W 4/06 |
| 2018/0199267 A1* | 7/2018 | Lin | ................. H04W 48/10 |

(Continued)

FOREIGN PATENT DOCUMENTS

| | | | |
|---|---|---|---|
| CN | 105519187 A | 4/2016 | |
| CN | 106171011 A | 11/2016 | |

(Continued)

OTHER PUBLICATIONS

Potevio, "Discussion of Other SI request", R2-1700249, 3GPP TSG RAN WG2 NR Ad Hoc, Jan. 17-19, 2017 (Year: 2017).*

(Continued)

*Primary Examiner* — Khoa Huynh
(74) *Attorney, Agent, or Firm* — Getech Law LLC; Jun Ye

(57) ABSTRACT

Embodiments of the present disclosure provide methods and devices for transmitting SI. The method includes: when the terminal transmits an other SI request, determining a transmission mode of an other SI request according to configuration information, which is pre-stored by the terminal or configured by a base station; and transmitting the other SI request to the base station according to the transmission mode. The other SI request is used to request for at least one type of other SI and the transmission mode includes transmitting the other SI request via msg1 or msg3.

16 Claims, 6 Drawing Sheets

(56) References Cited

U.S. PATENT DOCUMENTS

2019/0141746 A1 5/2019 Hong et al.
2019/0223082 A1 7/2019 He et al.

FOREIGN PATENT DOCUMENTS

| CN | 106304388 A | 1/2017 |
| CN | 106714114 A | 5/2017 |
| CN | 107645761 A | 1/2018 |
| WO | 2016130353 A2 | 8/2016 |
| WO | 2016130354 A1 | 8/2016 |
| WO | 2016130355 A1 | 8/2016 |

OTHER PUBLICATIONS

EP18772642.7, EESR issued Dec. 6, 2019, 10 Pages.
PCT/CN2018/074670, IPRP mailed Oct. 3, 2019, 7 Pages (English Translation).
CN201710179204.X, Official Action dated May 23, 2019, 12 Pages (English Translation).
R2-1700249, Potevio, "Discussion of Other SI Request", 3GPP TSG RAN WG2 NR Ad Hoc, Jan. 19, 2017, 6 pages, 3.2.2.4, Spokane, USA.
R2-1708428, Vivo, "Discussion on on-demand SI Request", 3GPP TSG-RAN WG2 Meeting #99, Aug. 21, 2017, 5 pages, 10.4.1.5.6, Berlin, Germany.
R2-1701260, LG Electronics Inc., "MSG1 vs MSG3", 3GPP TSG-RAN WG2 Meeting #97, Feb. 13, 2017, 3 pages, 10.2.2.4, Athens, Greece.
R2-1700817, Samsung, "On Demand SI Request Transmission Mechanism", 3GPP TSG-RAN WG2 Meeting # 97, Feb. 13, 2017, 2 pages, 10.2.2.4, Athens, Greece.
R2-1710943, Vivo, "Discussion on other SI Request", 3GPP TSG-RAN WG2 Meeting #99bis, Oct. 9, 2017, 5 pages, 10.4.1.6.7, Prague, Czech Republic.

* cited by examiner

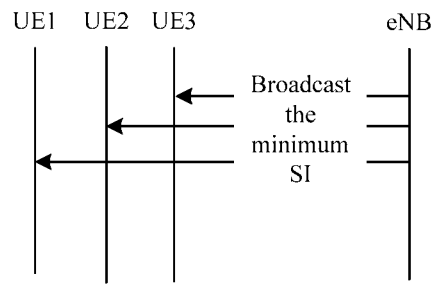
A
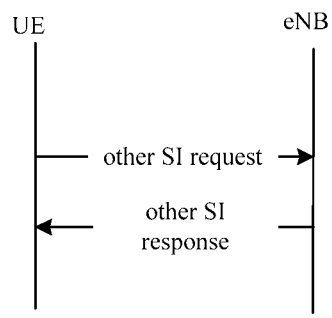
B
Fig. 1
when a terminal transmits an other SI request, a transmission mode of the other SI request is determined according to configuration information, which is pre-stored by the terminal or configured by a base station — S201
the other SI request is transmitted to the base station via the transmission mode — S202
Fig. 2

METHOD AND DEVICE FOR TRANSMITTING SYSTEM INFORMATION

CROSS-REFERENCE TO RELATED APPLICATION

This application is the U.S. national phase of PCT Application No. PCT/CN2018/074670 filed on Jan. 31, 2018, which claims the benefit and priority of Chinese Application No. 201710179204.X, filed on Mar. 23, 2017. The entire disclosures of the application are incorporated herein by reference.

TECHNICAL FIELD

This disclosure relates to a field of communication technology, and more particularly to methods and devices for transmitting system information.

BACKGROUND

In order to reduce signaling overhead of the terminal, improve utilization of the radio resources and reduce energy consumption of the base station, in the 5th-Generation (5G) communication system, the System Information (SI) is classified into two categories, where the first one is the minimum SI and the other is other SI. The other SI includes all SI except for the minimum SI. As for the minimum SI, as shown in figure A of FIG. 1, the network side (i.e., base station) transmits the minimum SI to the User Equipment (UE) (i.e., terminal) in the form of periodic broadcasting. As for other SI, as shown in figure B of FIG. 1, the terminal transmits a request for obtaining other SI (i.e., other SI request) to the base station, the base station transmits an other SI response to the terminal after the base station responds to the other SI request. The other SI response includes other SI requested by the terminal.

At present, in the process of 5G standardization, two modes for the terminal to transmit the other SI request are put forward. One mode is transmitting the other SI request via random access message 1 (msg1) and the other mode is transmitting the other SI request via random access message 3 (msg3). Both modes have advantages and disadvantages, however, the related art does not provide a solution on how to determine between the two transmission modes of the other SI.

SUMMARY

In view of this, embodiments of the present disclosure provide methods and devices for transmitting SI.

According to a first aspect, embodiments of the present disclosure provide a method for transmitting SI, applied to a terminal, including:

determining a transmission mode of an other SI request according to configuration information, which is pre-stored by the terminal or configured by a base station, when the terminal transmits the other SI request; and transmitting the other SI request to the base station according to the transmission mode;

wherein the other SI request is configured to request for at least one type of other SI and the transmission mode includes transmitting the other SI request via msg1 or msg3.

According to a second aspect, embodiments of the present disclosure provide a method for transmitting SI, applied to a base station, including:

transmitting configuration information to a terminal, wherein the configuration information is configured to determine a mode used by the terminal to transmit an other SI request;

receiving the other SI request transmitted from the terminal;

in response to the other SI request, transmitting an other SI response to the terminal via a dedicated Radio Resource Control (RRC) message or a broadcast message to the terminal, wherein the other SI response carries the other SI requested by the terminal.

According to a third aspect, embodiments of the present disclosure provide a device for transmitting System Information (SI), including:

a determining module, configured to determine a transmission mode of an other SI request according to configuration information, which is pre-stored by a terminal or configured by a base station, when the terminal transmits the other SI request; and a first transmitting module, configured to transmit the other SI request to the base station according to the transmission mode;

wherein the other SI request is configured to request for at least one type of other SI, and the transmission mode includes transmitting the other SI request via msg1 or msg3.

According to a fourth aspect, embodiments of the present disclosure provide a device for transmitting System Information (SI), including:

a second transmitting module, configured to transmit configuration information to a terminal, wherein the configuration information is configured to determine a mode used by the terminal to transmit an other SI request;

a third receiving module, configured to receive the other SI request transmitted from the terminal;

a third transmitting module, configured to, in response to the other SI request, transmit an other SI response to the terminal via a dedicated Radio Resource Control (RRC) message or a broadcast message to the terminal, wherein the other SI response carries the other SI requested by the terminal.

According to a fifth aspect, embodiments of the present disclosure provide a device for transmitting System Information (SI), including: a processor, a storage and computer programs, which are stored in the storage and run on the processor, when the computer programs are executed by the processor, steps in the method for transmitting the SI in the first aspect are executed.

According to a sixth aspect, embodiments of the present disclosure provide a device for transmitting System Information (SI), including: a processor, a storage and computer programs, which are stored in the storage and run on the processor, when the computer programs are executed by the processor, steps in the method for transmitting the SI in the second aspect are executed.

According to a seventh aspect, embodiments of the present disclosure provide a computer readable storage medium, wherein the computer readable storage medium stores computer programs, when the computer programs are executed by the processor, steps in the method for transmitting the SI in the first aspect are executed.

According to an eighth aspect, embodiments of the present disclosure provide a computer readable storage medium, wherein the computer readable storage medium stores computer programs, when the computer programs are executed by the processor, steps in the method for transmitting the SI in the second aspect are executed.

With the methods and devices for transmitting the SI in embodiments of the present disclosure, when the terminal transmits the other SI request, the terminal determines the transmission mode of the other SI request according to the configuration information, which is pre-stored in the terminal or configured by the base station, and transmits the other SI request to the base station according to the transmission mode. The other SI request is configured to request for at least one type of other SI and the transmission mode includes transmitting the other SI request via msg1 or msg3. Therefore, the terminal may determine the transmission mode of the other SI request according to the preset configuration information, the advantages of transmitting the other SI request using the msg1 and msg3 are given full play and the disadvantages of single transmission mode may be effectively avoided.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

FIG. 1 is a flow chart illustrating a method for transmitting SI in the related art;

FIG. 2 is a flow chart illustrating a method for transmitting SI according to an embodiment of the present disclosure;

DETAILED DESCRIPTION

Figure 3:
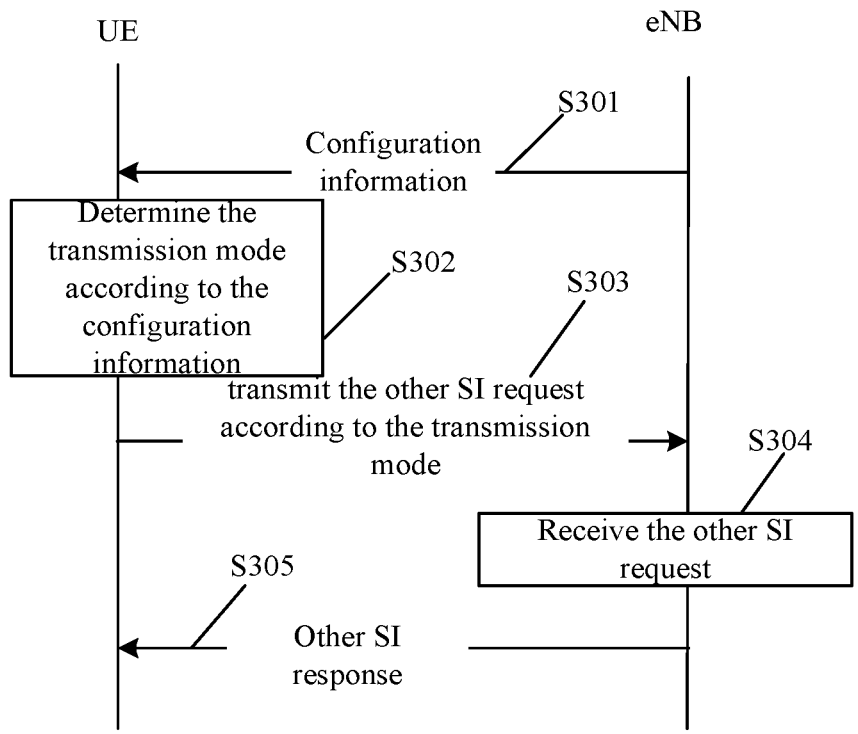
FIG. 3 is a flow chart illustrating another method for transmitting SI according to an embodiment of the present disclosure.

The technical solutions of embodiments of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

The other SI, like the 4th-Generation (4G) Long Term Evolution (LTE), may include multiple System Information Blocks (SIB)s. Generally speaking, the other SI includes multiple types, such as SIB1, SIB2 . . . SIBn. When the terminal requests for the other SI, the terminal may request for at least one SIB, that is, the terminal may request for any one or more SIBs from the SIB set, which means that the base station receives multiple types of SIBs corresponding to the other SI request. The other SI request, which is used by the terminal for requesting for multiple SIBs, is called as an other SI combination request.

At present, in the process of 5G standardization, two modes for transmitting the other SI request by the terminal are put forward. One mode is transmitting the other SI request via msg1 and the other mode is transmitting the other SI request via msg3. After the base station receives the other SI request from the terminal, when the terminal transmits the other SI request via the msg1, the base station only may transmit the other SI requested by the terminal to the terminal via a broadcast signaling. When the terminal transmits the other SI request via the msg3, the base station may transmit the other SI requested by the terminal to the terminal via the broadcast signaling or a dedicated signaling.

As for the two modes for the terminal to transmit the other SI request, when the terminal transmits the other SI request via the msg1, the base station needs to reserve specific preambles and Physical Random Access Channel (PRACH) resources for the terminal. Therefore, when all other SI requests and other SI combination requests from the terminal need to be satisfied, lots of preambles need to be reserved. In the request mode that the terminal transmits the other SI request via the msg1, the characteristics of the PRACH channel may satisfy that multiple terminals may simultaneously transmit the other SI requests via the msg1, while the base station only may transmit the other SI requested by the terminal to the terminal via the broadcast signaling. As for transmitting the other SI request via the msg3, when multiple terminals simultaneously transmit the other SI requests, collision may occur, that is, when the msg3 fails in the competition, the terminal repeatedly transmits the other SI request via the msg3, which increases energy consumption and signaling overhead of the terminal and further increases delay for the terminal to obtain the other SI. When the msg3 carries all other SI requests and other SI combination requests, the base station may transmit other SI requested by the terminal to the terminal in the dedicated signaling mode.

At present, modes for the terminal to transmit the other SI request have their respective advantages and disadvantages. Therefore, embodiments of the present disclosure provides a mode for combining the above two modes for transmitting the other SI request, that is, the terminal may transmit the other SI request via msg1 or msg3 according to pre-configuration of the base station. In an alternative, the terminal determines to use the msg1 or msg3 to transmit the other SI request according to the type of the requested other SI.

The technical scheme of the present disclosure is further described hereinafter in detail in combination with the accompanying drawings and specific embodiments.

This embodiment of the present disclosure provides a method for transmitting SI, which is applied to a terminal. The function of this method can be implemented by a processor in the terminal through calling program codes. Of course, the program codes may be saved in a computer storage medium. It can be seen that the terminal at least includes a processor and a storage.

FIG. 2 is a flow chart illustrating a method for transmitting SI according to an embodiment of the present disclosure. As shown in FIG. 2, the method includes:

Block S201, when a terminal transmits an other SI request, a transmission mode of the other SI request is determined according to configuration information, which is pre-stored by the terminal or configured by a base station.

The other SI request is used to request for at least one kind of other SI. The transmission mode includes: transmitting the other SI request via msg1 or msg3.

In this embodiment, the pre-stored configuration information may be configured in the storage medium of the terminal by default in the factory. The pre-stored configuration information may be that generated by the terminal according to program settings and then pre-stored in the storage medium of the terminal. The pre-stored configuration information may also be that in instructions received by the terminal from the base station and then pre-stored in the storage medium of the terminal. When the terminal transmits the other SI request, the terminal finds the configuration information from the storage medium and determines the transmission mode of the other SI request according to configuration information. Therefore, the terminal may determine the transmission mode of the other SI request according to the configuration information, the advantages of transmitting the other SI request using the msg1 and msg3 are given full play and the disadvantages of single transmission mode may be effectively avoided.

In this embodiment, the other SI request may request for at least one type of the other SI for the terminal, that is, the other SI request in block S201 may be a request of the single other SI or a request of the other SI combination.

In this embodiment, the transmission mode of the other SI includes at least one of transmitting the other SI request via the msg1 or transmitting the other SI request via the msg3.

Block S202, the other SI request is transmitted to the base station via the transmission mode.

In other embodiments of the present disclosure, when the configuration information includes associated information, the method further includes that: the base station transmits the associated information to the terminal via broadcast signaling. In other words, the associated information may be transmitted to the terminal by the base station via the broadcast signaling. For instance, the base station carries the associated information in the minimum SI and transmits the minimum SI to the terminal via the broadcast signaling.

In other embodiments of the present disclosure, the method may further include:

Block S203, when the transmission mode is transmitting the other SI request via the msg1, an other SI response, which is transmitted from the base station via the broadcast signaling, is received using resources indicated by the base station; when the transmission mode is transmitting the other SI request via the msg3, the other SI response, which is transmitted from the base station via dedicated signaling, is received using the resources indicated by the base station.

The other SI response carries the other SI requested by the terminal. The dedicated signaling may be msg4.

Here, the configuration information further includes resources, which is used to determine the reception of the other SI by the terminal. Receiving the other SI response transmitted from the base station according to the resources indicated by the base station includes: receiving the other SI response transmitted from the base station according to the resources indicated by the configuration information.

According to the method for transmitting the SI in embodiments of the present disclosure, the terminal determines the transmission mode of the other SI request according to the configuration information, which is pre-stored in the terminal or configured by the base station. Then, the terminal transmits the other SI request to the base station according to the transmission mode, by which the terminal may determine the transmission mode of the other SI request according to the configuration information.

In other embodiments of the present disclosure, receiving the configuration information transmitted from the base station includes: receiving the associated information transmitted from the base station via the broadcast signaling.

In other embodiments of the present disclosure, receiving the configuration information transmitted from the base station includes: receiving the minimum SI transmitted from the base station via the broadcast signaling. The minimum SI includes the associated information.

In other embodiments of the present disclosure, the configuration information is preset in the terminal. In one of the implementation processes, the configuration information is manually preset or the terminal generates the configuration information and presets the configuration information in its storage medium.

In other embodiments of the present disclosure, the configuration information at least includes two types.

The first type is that the configuration information is used to determine the transmission mode for the terminal to transmit the other SI request. The first type is mainly obtained from the instruction of the base station. The method further includes receiving the configuration information transmitted from the base station. Accordingly, at block S201, determining the transmission mode of the other SI request according to the pre-stored configuration information includes: determining the transmission mode according to the configuration information transmitted from the base station. In the implementation process, receiving the configuration transmitted from the base station may include: receiving, by the terminal in a state transition procedure, a Radio Resource Control (RRC) message, which is transmitted from the base station and carries the configuration information. The state transition procedure includes: a procedure for transiting from a connected state or an inactive state to an idle state, or transiting from a connected state to an inactive state.

The second type is that the configuration information is used to indicate associated information between the identifying information of the other SI and the transmission mode and/or the associated information between the identifying information of the other SI combination and the transmission mode. The other SI combination includes at least two types of the other SI. Accordingly, at block S201, determining the transmission mode of the other SI request according to the pre-stored configuration information includes: searching the associated information for the transmission mode according to the identifying information of the other SI or the identifying information of the other SI combination in the configuration information. In the implementation process, the identifying information of the other SI combination may be the combination of the identifying information of the multiple requested other SI, as long as the identifying information of the other SI combination corresponds to multiple other SI.

In the implementation process, the identifying information of the other SI may be the name of the other SI, such as SIB1, or may be the index of the other SI, as long as the identifying information of the other SI may be used to identify different other SI.

In this embodiment, the method further includes that: the other SI is classified into other SI of the first type and other SI of the second type. The other SI of the first type and the other SI of the second type respectively correspond to different transmission modes. In this embodiment, classifying the other SI into two types is to make the other SI correspond to two different transmission modes, therefore saving signaling overhead and terminal energy consumption. Therefore, the other SI response may be transmitted to the terminal via a broadcast and dedicated signaling combined mode.

In the implementation process, the other SI may be classified into two types via different classification principles. For instance, the classification principles includes: classifying the other SI, in which the request frequency of the terminal is larger than a preset frequency threshold, and the other SI combination thereof into the other SI of the first type and classifying the other SI, which is not included in the other SI of the first type, and the other SI combination thereof into the other SI of the second type.

In the implementation process, the associated information may be a mapping relationship table. The associated information may be set by the terminal, may be manually set, or may be the instruction transmitted from the base station to the terminal. The generation process of the association information is described hereinafter. The generation process of the association information may be implemented by the terminal and base station. The generation process of the associated information includes following blocks.

Block S221, a transmission frequency of all other SI is determined.

Here, there are many kinds of methods for determining the transmission frequency of the other SI. For instance, the transmission frequency may be determined as a statistic of the transmission frequency of the other SI of all terminals, may be determined as a statistic of the transmission frequency of the other SI of the same terminal or may be a manually-set empirical value.

Block S222, the other SI is classified into different types according to the transmission frequency.

Here, it is supposed that the other SI is classified into two types. That is, other SI, the transmission frequency of which is larger than a preset frequency threshold, is classified into the other SI of the first type and the other SI, the transmission frequency of which is less than or equals to the preset frequency threshold, is classified into the other SI of the second type Block S223, corresponding transmission modes are respectively set for the other SI of the first type and the other SI of the second type.

Here, the transmission modes may be manually-set or determined according to a program. For instance, the other SI of the first type is that, the transmission frequency of which is larger than the preset frequency threshold and corresponding transmission mode is configured as transmitting the other SI via msg1. On the contrary, the transmission mode is configured as transmitting the other SI via msg3.

Block S224, the associated information is generated according to the corresponding relationship between the other SI of the first type and the configured transmission mode and the corresponding relationship between the other SI of the second type and the configured transmission mode.

Here, the associated information may be a mapping relationship table.

With the method for transmitting the SI provided in this embodiment of the present disclosure, different transmission modes are determined via the transmission frequencies of the different other SI. When the terminal needs to transmit the other SI request, it may be implemented that the mode for transmitting the other SI request may be rapidly found, such as transmitting the other SI via the msg1 or msg3.

Based on the above embodiments, embodiments of the present disclosure provide a method for transmitting SI. The method applies to a system for transmitting the SI. The system includes: a terminal and a base station. FIG. 3 is a flow chart illustrating another method for transmitting the SI according to an embodiment of the present disclosure. As shown in FIG. 3, the method includes:

Block S301, the base station transmits configuration information to the terminal. The configuration information is used to determine a mode for the terminal to transmit an other SI request.

Here, transmitting the configuration information to the terminal includes: transmitting the minimum SI to the terminal via the broadcast signaling. The minimum SI includes the associated information. Accordingly, the terminal receives the minimum SI information transmitted from the base station via the broadcast signaling.

In this embodiment, as mentioned above, each transmission mode has its characteristics, such as the terminal transmits the other SI request via msg1 and the base station needs to reserve specific preambles and PRACH resources for the terminal. Therefore, when all other SI requests and other SI combination requests of the terminal needs to be satisfied, lots of preambles need to be reserved. As for the other SI request transmitted via the msg3, when multiple terminals simultaneously transmit the other SI requests, collision may occur, that is when msg3 fails in the competition, the terminal repeatedly sends out the other SI request via the msg3, which increases energy consumption and signaling overhead of the terminal and further increases delay for the terminal to obtain the other SI. Therefore, the base station may configure the transmission mode for the terminal according to the number of the preambles and state information of the terminal, such as energy consumption, time delay and signaling overhead, etc. Such as, when the number of the preambles of the base station is larger than a preset threshold and there are available PRACH resources, the base station indicates that the terminal transmits the other SI request via the msg1 in the configuration information; otherwise, the base station indicates that the terminal transmits the other SI request via the msg3 in the configuration information. When the terminal considers its energy consumption is less than a preset energy consumption threshold, the base station may indicate that the terminal transmits the other SI request via the msg1 in the configuration information; otherwise, the base station indicates that the terminal transmits the other SI request via the msg3 in the configuration information. For another instance, when the terminal considers its delay is larger than a preset delay threshold, the base station may indicate that the terminal transmits the other SI request via the msg1 in the configuration information; otherwise, the base station may indicate that the terminal transmits the other SI request via the msg3 in the configuration information.

Block S302, when the terminal transmits the other SI request, the terminal determines the transmission mode of the other SI request according to the configuration information transmitted from the base station.

Here, the other SI request is used to request at least one kind of other SI. The transmission mode includes transmitting the other SI request via the msg1 or msg3.

Here, the other SI request may be used to request for at least one type of the other SI for the terminal, that is, the other SI request in block S302 may be a request of the single other SI or a request of the other SI combination. When the terminal requests for multiple SIBs, the other SI request may be called as the other SI combination request.

Block S303, the terminal transmits the other SI request to the base station according to the transmission mode.

Here, block S302 and block S303 may respectively refer to block S201 and block S202 in the embodiment shown in FIG. 2, respectively for.

Here, when the transmission mode, in which the msg1 is used, the configuration information configured by the base station or pre-stored by the terminal is used, specific preambles are used, different preambles correspond to different other SI and other SI combination. When the transmission mode, in which the msg3 is used, the msg3 carries the request for one or multiple other SI transmitted from the terminal.

Block S304, the base station receives the other SI request transmitted from the terminal.

Block S305, a response to the other SI request is made. The base station transmits an other SI response to the terminal via a dedicated Radio Resource Control (RRC) message or a broadcast message. The other SI response carries the other SI requested by the terminal.

Here, when the terminal transmits the other SI request using the transmission mode of msg1, the base station may transmit the other SI response using the broadcast signaling. When the terminal transmits the other SI request using the transmission mode of msg3, the base station may transmit the other SI response using the broadcast signaling or RRC message.

Here, when the transmission mode is transmitting the other SI request using the msg1, the terminal receives the other SI response broadcast by the base station via the broadcast signaling according to the resources indicated by the base station. When the transmission mode is transmitting the other SI request using the msg3, the terminal receives the other SI response transmitted from the base station via the dedicated signaling according to the resources indicated by the base station. The other SI response carries the other SI requested by the terminal.

In this embodiment, the configuration information is used to indicate associated information between the identifying information of the other SI and the transmission mode and/or the associated information between the identifying information of the other SI combination and the transmission mode when there are at least two types of other SI combinations. The other SI combination includes at least two types of the other SI.

In this embodiment, the configuration information is used to determine the transmission mode that the terminal transmits the other SI request.

With the method for transmitting the SI provided in this embodiment of the present disclosure, the base station indicates the transmission mode of the other SI request for the terminal and transmits the transmission mode as the configuration information to the terminal. Therefore, it may be implemented that the terminal determines the corresponding transmission mode when the terminal transmits the other SI request.

Generally speaking, states of the terminal at least include an idle state, an inactive state and a connected state. As for the terminal in the idle state/inactive state, the base station may pre-configure the transmission mode used by the terminal for transmitting the other SI request. The terminal determines the transmission mode of the other SI request according to the configuration information of the base station and receives the other SI transmitted from the base station to the terminal according to the transmission mode of the other SI request. Analysis is made hereinafter.

As for the terminal in the idle state/inactive state, the base station may configure the terminal via the RRC message. The configuration information is used to indicate that the terminal transmits the other SI request via the msg1 or msg3. In the implementation process, the terminal receives the configuration information transmitted from the base station in the state transition procedure, that is, the terminal receives the RRC message transmitted from the base station in the state transition procedure of the terminal. For instance, as for the terminal in the idle state, the base station may configure the terminal via the RRC message in the procedure that the state of the terminal is transited from the connected state/inactive state to the idle state. As for the terminal in the inactive state, the base station may configure the terminal via the RRC message in a procedure that the state of the terminal is transited from the connected state to the inactive state.

When the terminal needs to transmits the other SI request, the terminal selects the mode for transmitting the other SI request according to the configuration of the base station. When the terminal transmits the other SI request via the msg1, the base station transmits the other SI requested by the terminal on predefined resources (time/frequency, etc.) via the broadcast signaling after receiving the request. After the UE transmits the other SI request via the msg1, the UE receives the requested other SI transmitted from the base station on the predefined resources. As for the predefined resources, the base station and terminal have the same interpretation.

When the terminal needs to transmit the other SI request, the terminal selects a mode for transmitting the other SI request according to the configuration of the base station. When the terminal transmits the other SI request via the msg3, the base station transmits the other SI requested by the terminal via the RRC message. The RRC message may be msg4.

Generally speaking, the states of the terminal at least include an idle state, an inactive state and a connected state. As for the terminal in the idle state/inactive state, the UE determines types of the other SI according to describing parameters (request frequency) of to-be-requested other SI. The terminal determines the mode for transmitting the other SI request according to the type of the other SI and the terminal receives the other SI transmitted from the base station to the terminal according to the transmission mode of the other SI request. For instance, the other SI is classified into two types according to types of all SI and combinations of different types of SI.

The classification principles may be that other SI with relatively high terminal request frequency and the other SI combination thereof is classified as the other SI of type I. All other SI and other SI combination thereof, which are not included in the other SI of type I are classified as the other SI of type II. The other SI of type I and the other SI of type II respectively correspond to different transmission modes for the terminal to transmit the other SI request. For instance, the type I corresponds to that the other SI request is transmitted via the msg1 and the type II corresponds to that the other SI request is transmitted via the msg3. In the implementation process, the request frequency of the terminal may be a statistic probability of a terminal, the statistic probabilities of lots of terminals or may be an empirical value When the terminal needs to transmit the other SI request, the terminal determines the type of the other SI, to which the requested other SI belongs, via comparison, and determines the mode for transmitting the other SI request according to the type, to which the requested other SI belongs.

For instance, when the other SI, which belongs to the type I, exists, the terminal transmits the other SI request via the msg1. The base station transmits the other SI on pre-defined resources after receiving the request and the terminal receives the requested other SI on the pre-defined resources. When the other SI, which belongs to the type II, exists, the terminal transmits the other SI request via the msg3, the base station transmits the requested other SI to the terminal via the RRC message after receiving the request. The RRC message may be the msg4.

When the other SI requested by the terminal includes the other SI of the type I and the other SI of the type II, the following mode may be used. The terminal transmits the other SI request twice, which respectively correspond to the other SI of the type I and the other SI of the type II, specific process of which is similar to those in the above processes. The terminal transmits all other SI requests via the msg3, specific process of which is similar to those in the above processes, that is the other SI of both type I and type II are taken as that of the same type (the transmission mode corresponding to this type is msg3).

It should be noted that the technical scheme provided by each embodiment of the present disclosure may be used to solve the problem of how to transmit and receive the SI requested by the terminal in the 5G communication system and other communication systems. The base station may pre-configure the mode that the terminal transmits the other SI request and the terminal determines the mode for transmitting the other SI request according to the configuration of the base station. In an alternative, the other SI is pre-classified according to characteristics of the other SI, the terminal determines the mode for transmitting the other SI request according to the type of the other SI. It can be seen that the technical scheme provided by each embodiment of the present disclosure may utilize the merits of the msg1 and msg3 on transmitting the other SI request and effectively avoid the disadvantages resulting from the single transmission mode.

With the method for transmitting the SI in embodiments of the present disclosure, the base station indicates the configuration information. The configuration information is used to determine the transmission mode for the terminal to transmit the other SI request, or the configuration information is used to indicate the associated information between the identifying information of the other SI and the transmission mode thereof and/or the associated information between the identifying information of the other SI combination and the transmission mode thereof. Therefore, the terminal may determine the mode for transmitting the other SI according to the configuration information indicated by the base station.

Based on the above embodiments, embodiments of the present disclosure provide a device for transmitting the first other SI (first device). Each module in the first device and each unit included in each module can be realized by a first processor in the terminal, of course, also be realized by specific logic circuits. In the implementation process, the first processor can be a Central Processing Unit (CPU), Microprocessor (MPU), Digital Signal Processor (DSP) or Field Programmable Gate Array (FPGA).

Figure 4A:
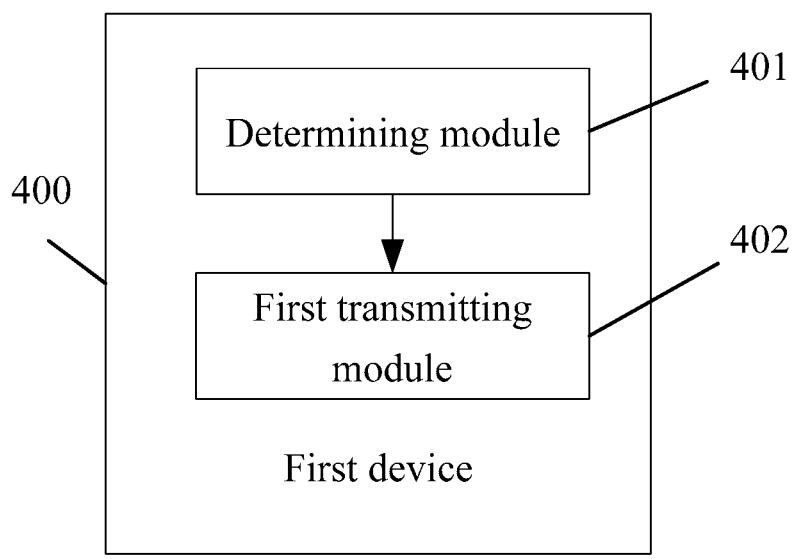
FIG. 4A is a first diagram illustrating structure of a first device according to an embodiment of the present disclosure.

FIG. 4A is a diagram illustrating structure of a first device according to an embodiment of the present disclosure. As shown in FIG. 4A, the first device 400 includes: a determining module 401 and a first transmitting module 402.

The determining module 401 is configured to, when the terminal transmits an other SI request, determine a transmission mode of the other SI request according to configuration information, which is pre-stored by a terminal or configured by a base station. The other SI request is used to request for at least one kind of other SI. The transmission mode includes: transmitting the other SI request via msg1 or msg3.

The first transmitting module 402 is configured to transmit the other SI request to the base station according to the transmission mode.

In other embodiments of the present disclosure, the configuration information is pre-configured in the terminal.

In other embodiments of the present disclosure, the configuration information is used to indicate associated information between identifying information of the other SI and a transmission mode of the other SI and/or associated information between identifying information of an other SI combination and a transmission mode of the other SI combination when the other SI combination includes at least two types of other SI.

Figure 4B:
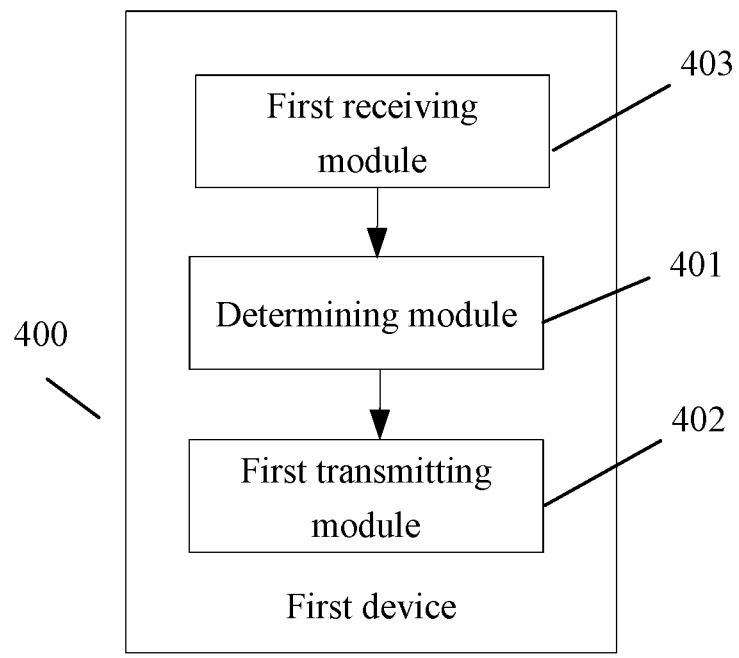
FIG. 4B is a second diagram illustrating structure of the first device according to an embodiment of the present disclosure.

In other embodiments of the present disclosure, as shown in FIG. 4B, the terminal further includes: a first receiving module 403, which is configured to receive the configuration information transmitted from the base station, such as receiving the associated information transmitted from the base station via the broadcast signaling.

In other embodiments of the present disclosure, the configuration information is used to determine the transmission mode used by the UE to transmit the other SI request.

The determining module is configured to determine the transmission mode according to the configuration information transmitted from the base station.

In other embodiments of the present disclosure, the determining module 401 is configured to search the associated information for the transmission mode according to the identifying information of the to-be-requested other SI or the identifying information of the other SI combination.

In other embodiments of the present disclosure, the first receiving module 403 is configured to receive a Radio Resource Control (RRC) message carrying the configuration information transmitted from the base station when the terminal is in a state transition procedure.

In other embodiments of the present disclosure, the state transition procedure includes: a procedure of transiting from a connected state or inactive state to an idle state, or a procedure of transiting from the connected state to the inactive state.

In other embodiments of the present disclosure, the transmission mode includes one of following:
transmitting the other SI request via the msg1;
transmitting the other SI request via the msg3.

Figure 4C:
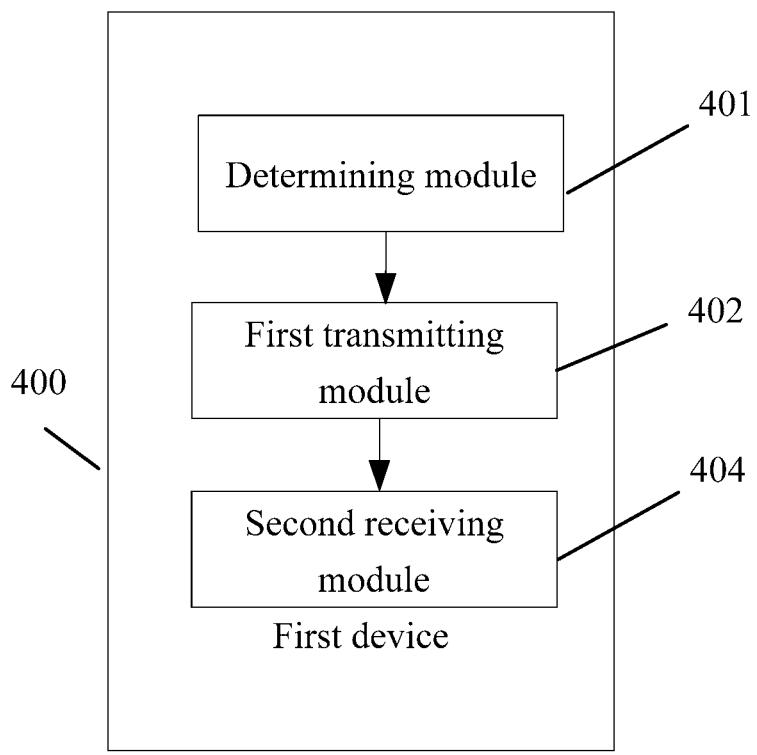
FIG. 4C is a third diagram illustrating structure of the first device according to an embodiment of the present disclosure.

In other embodiments of the present disclosure, as shown in FIG. 4C, the configuration information further includes: resources for the terminal to receive the other SI, the device further includes: a second receiving module 404, configured to receive the other SI response transmitted from the base station according to resources of the other SI indicated in the configuration information.

In other embodiments of the present disclosure, the terminal further includes a second receiving module 404, configured to, when the transmission mode is transmitting the other SI request via the msg1, receive the other SI response transmitted from the base station via a broadcast signaling according to resources indicated by the base station. When the transmission mode is transmitting the other SI request via the msg3, the second receiving module 404 is configured to receive the other SI response transmitted from the base station via dedicated signaling according to the resources indicated by the base station. The other SI response carries the other SI requested by the terminal and the dedicated signaling may be msg4.

Figure 4D:
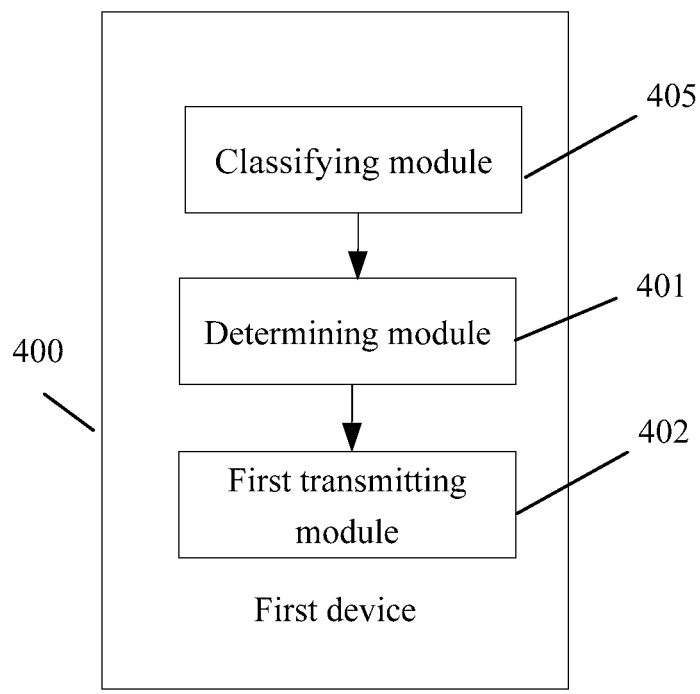
FIG. 4D is a fourth diagram illustrating structure of the first device according to an embodiment of the present disclosure.

In other embodiments of the present disclosure, as shown in FIG. 4D, the terminal further includes: a classifying module 405, configured to classify the other SI into other SI of a first type and other SI of a second type. The other SI of the first type and the other SI of the second type respectively correspond to different transmission modes.

The other SI may be classified according to classification principles, the classification principles include: classifying the other SI, in which the request frequency of the terminal is larger than a preset frequency threshold and the other SI combination thereof into the other SI of the first type, and classifying the other SI, which is not included in the other SI of the first type, and the other SI combination thereof into the other SI of the second type.

In other embodiments of the present disclosure, the configuration information further includes: resources for the terminal to receive the other SI. The second receiving module is configured to receive the other SI response transmitted from the base station according to resources indicated in the configuration information.

Figure 4E:
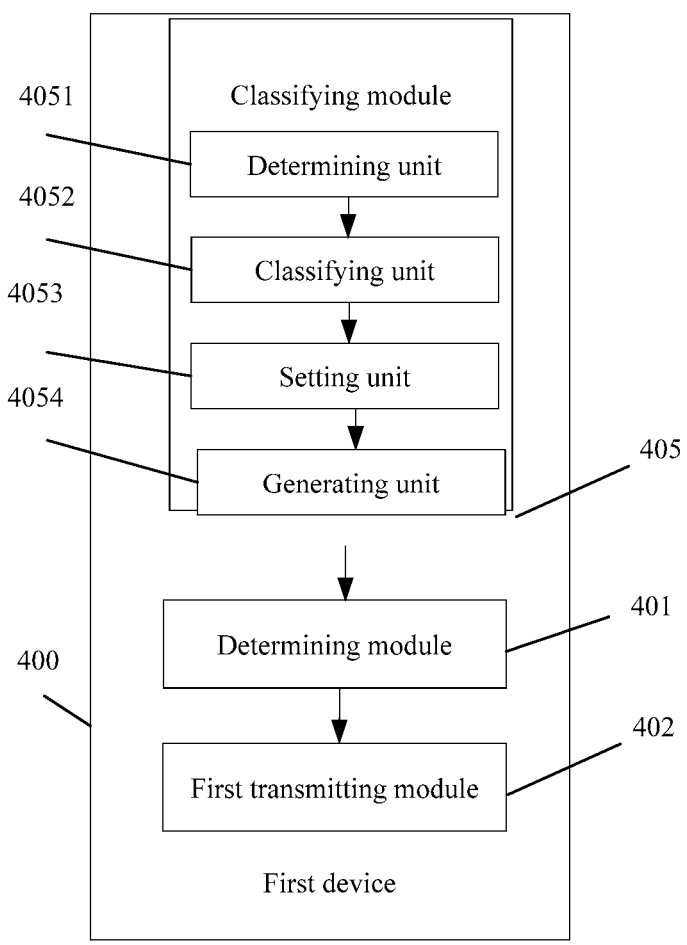
FIG. 4E is a fifth diagram illustrating structure of the first device according to an embodiment of the present disclosure.

In other embodiments of the present disclosure, as shown in FIG. 4E, the classifying module 405 further includes:

a determining unit 4051, configured to determine a transmission frequency of the other SI;

a classifying unit 4052, configured to classify the other SI, based on transmission frequency of which is larger than a preset frequency threshold, into the other SI of the first type, and classify the other SI, based on transmission frequency of which is less than or equals to the frequency threshold, into the other SI of the second type;

a setting unit 4053, configured to respectively set corresponding transmission modes for the other SI of the first type and the other SI of the second type; and a generating unit 4054, configured to generate the associated information according to a corresponding relationship between the other SI of the first type and the set transmission mode and a corresponding relationship between the other SI of the second type and the set transmission mode.

In the device for transmitting the SI provided by the embodiments of the present disclosure, the terminal determines the transmission mode of the other SI request according to the configuration information, which is pre-stored by the terminal or configured by the base station. Then, the terminal transmits the other SI request to the base station according to the transmission mode. Therefore, the terminal may determine the transmission mode of the other SI according to the configuration information.

Based on the foregoing embodiments, embodiments of the present disclosure provide a system for transmitting the SI, the system includes: a first SI transmitting device (first device) and a second SI transmitting device (second device). Each module in the first device and each unit in the each module can be implemented by a first processor in the terminal. Each module in the second device and each unit in the each module can be implemented by a second processor in the base station, or by specific logic circuits. In the implementation process, the processor can be the Central Processing Unit (CPU), Microprocessor (MPU), Digital Signal Processor (DSP) or Field Programmable Gate Array (FPGA), etc.

Figure 4F:
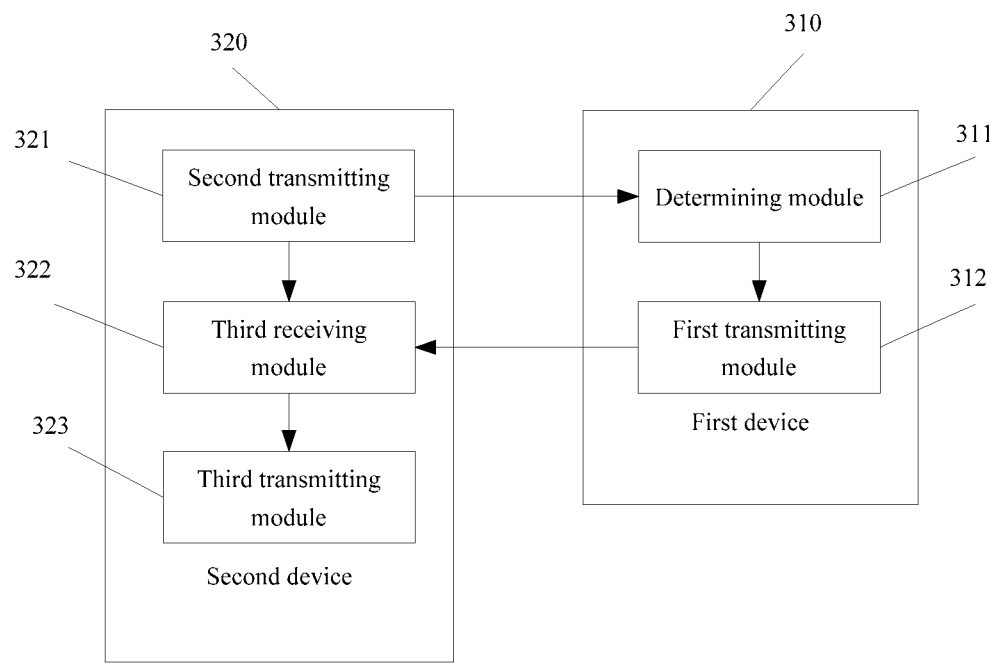
FIG. 4F is a diagram illustrating structure of a system for transmitting SI according to an embodiment of the present disclosure.

FIG. 4F is a diagram illustrating structure of a system for transmitting SI according to an embodiment of the present disclosure. As shown in FIG. 4F, the system for transmitting the SI includes: a first device 310 and a second device 320. The first device 310 includes a determining module 311 and a first transmitting module 312. The second device 320 includes: a second transmitting module 321, a third receiving module 322 and a third transmitting module 323.

The second transmitting module 321 is configured to transmit configuration information to a terminal, wherein the configuration information is used to determine a mode used by the terminal to transmit an other SI request.

Here, the second transmitting module is configured to transmit the minimum SI to the terminal via a broadcast signaling and the minimum SI includes the associated information.

The determining module 311 is configured to, when the terminal transmits the other SI request, determine the transmission mode of the other SI request according to the configuration information transmitted from the base station. The other SI request is used to request for at least one type of other SI.

The first transmitting module 312 is configured to transmit the other SI request to the base station according to the transmission mode.

The third receiving module 322 is configured to receive the other SI request transmitted from the terminal.

The third transmitting module 323 is configured to, in response to the other SI request, transmit an other SI response to the terminal via a dedicated Radio Resource Control (RRC) message or a broadcast message to the terminal. The other SI response carries the other SI requested by the terminal.

In other embodiments of the present disclosure, the configuration information is used to indicate associated information between identifying information of the other SI and the transmission mode thereof and/or the associated information between identifying information of an other SI combination and the transmission mode thereof when the other SI combination includes at least two types of other SI.

In other embodiments of the present disclosure, the configuration information is used to determine a transmission mode used by the terminal to transmit the other SI request.

In other embodiments of the present disclosure, the third transmitting module 323 of the second device is further configured to transmit the other SI response to the terminal according to the resources indicated by the terminal.

It should be noted that the description of the above device or system embodiments is similar to the description of the above method embodiments, and the device and system embodiments have beneficial effects, which are similar to those of the method embodiments. For technical details, which are not disclosed in the device or system embodiments of the present disclosure, please refer to the description of method embodiments of the present disclosure for understanding.

With the system for transmitting the SI in embodiments of the present disclosure, the terminal may determine the mode (such as msg1 and msg3) for transmitting the other SI request according to the configuration information, which is pre-stored in the terminal or indicated by the base station. Therefore, the advantages of transmitting the other SI request using the msg1 and msg3 are given full play and the disadvantages brought out by single transmission mode may be effectively avoided.

Figure 5:
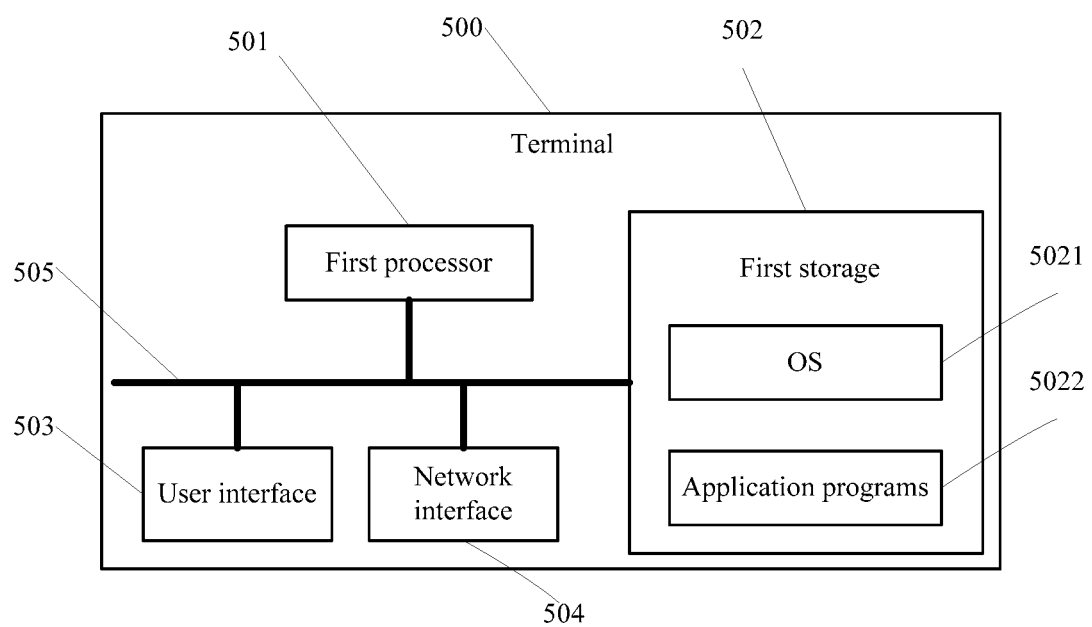
FIG. 5 is a diagram illustrating structure of a terminal according to an embodiment of the present disclosure.

Based on the above embodiments, FIG. 5 is a diagram illustrating a terminal according to an embodiment of the present disclosure. The terminal 500 shown in FIG. 5 includes: at least one first processor 501, a first storage 502, at least one network interface 504 and a user interface 503. Each component in the terminal 500 is coupled together via bus system 505. It can be understood that the bus system 505 is used to implement connected communication among these components. Besides a data bus, the bus system 505 further includes: a power bus, control bus and a state signal bus. For clear description, various buses in FIG. 5 are labeled as the bus system 505. The terminal 500 may be a cell phone, tablet computer, Personal Digital Assistant (PDA) or an on-board computer, etc.

The user interface 503 may include a display device, keyboard or click device, such as a mouse, trackball, touch board or touch screen, etc.

It can be understood that the first storage 502 in embodiments of the present disclosure can be a volatile storage or a nonvolatile storage, or both the volatile and non-volatile storage. The nonvolatile storage can be Read Only Memory (ROM), Programmable Read-Only Memory (PROM), Erasable Programmable Read-Only Memory (EPROM), Electrically Erasable Programmable Read-Only Memory (EEPROM) or flash. The volatile storage can be Random Access Memory (RAM), which is used as an external cache. As an illustrative but not restrictive specification, many forms of RAMs are available, such as Static RAM (SRAM), Dynamic RAM (DRAM), Synchronous DRAM (SDRAM), Double Data Rate SDRAM (DDRSDRAM), Enhanced SDRAM (ESDRAM), Synch Link DRAM (SLDRAM) and Direct Rambus RAM (DRRAM). The first storage 502 of the system and method described in embodiments of the present disclosure include, but is not limited to, these and any other suitable types of storages.

In some embodiments, the first storage 502 stores following elements, such as executable modules, data structure, subset thereof, or superset thereof: OS 5021 and application programs 5022.

The OS 5021 includes various kinds of system programs, such as a framework layer, a core library layer and a driver layer, which are used to implement various kinds of basic services and process hardware-based tasks. The application programs 5022 include various kinds of application programs, such as Media Player and Browser, which are used to implement various kinds of application services. Programs, which are used to implement methods in embodiments of the present disclosure, may be included in the program applications 5022.

In embodiments of the present disclosure, programs or instructions stored in the first storage 502 are called, specifically, the programs or instructions stored in the application programs 5022 are called. The first storage 502 is configured to store computer executable instructions. The first processor 501 is configured to execute stored computer executable instructions. The first processor 501 is used to determine a transmission mode of an other SI request according to configuration information, which is pre-stored by the terminal or configured by a base station, when the terminal transmits the other SI request; and transmit the other SI request to the base station according to the transmission mode. The other SI request is used to request for at least one type of other SI and the transmission mode includes transmitting the other SI request via msg1 or msg3.

The first processor 501 is further used to receive the configuration information transmitted from the base station before determining the transmission mode of the other SI request according to the configuration information configured by the base station.

The configuration information is used to determine the transmission mode used by the terminal to transmit the other SI request. The configuration information is used indicate associated information between identifying information of the other SI and a transmission mode of the other SI and/or associated information between identifying information of an other SI combination and a transmission mode of the other SI combination, the other SI combination includes at least two types of other SI.

The first processor 501 is further used to search the associated information for the transmission mode according to the identifying information of the other SI or the identifying information of the other SI combination in the configuration information.

The first processor 501 is further used to receive a Radio Resource Control (RRC) message carrying the configuration information transmitted from the base station in a state transition procedure. The state transition procedure includes: a procedure of transiting from a connected state or inactive state to an idle state, or a procedure of transiting from the connected state to the inactive state.

The first processor 501 is further used to, after transmitting the other SI request to the base station according to the transmission mode, receive an other SI response transmitted from the base station via a broadcast signaling according to resources indicated by the base station when the transmission mode is transmitting the other SI request via the msg1; and receive the other SI response transmitted from the base station via dedicated signaling according to the resources indicated by the base station when the transmission mode is transmitting the other SI request via the msg3. The other SI response carries the other SI requested by the terminal.

The configuration information further includes resources for the terminal to receive the other SI. The first processor 501 is further used to receive the other SI response transmitted from the base station according to resources of the other SI indicated in the configuration information.

The first processor 501 is further used to, before determining the transmission mode of the other SI request according to the configuration information pre-stored by the terminal, classify the other SI into other SI of a first type and other SI of a second type. The other SI of the first type and the other SI of the second type respectively correspond to different transmission modes.

The first processor 501 is further used to determine a transmission frequency of the other SI; classify the other SI, based on transmission frequency of which is larger than a preset frequency threshold, into the other SI of the first type; and classify the other SI, based on transmission frequency of which is less than or equals to the frequency threshold, into the other SI of the second type; respectively set corresponding transmission modes for the other SI of the first type and the other SI of the second type; and generate the associated information according a corresponding relationship between the other SI of the first type and the set transmission mode, and a corresponding relationship between the other SI of the second type and the set transmission mode.

The first processor 501 is further used to receive the associated information transmitted from the base station via a broadcast signaling.

The first processor 501 is further used to receive the minimum SI transmitted from the base station via the broadcast signaling. The minimum SI includes the associated information.

The terminal 500 may implement each process implemented by the device for transmitting the SI in the above embodiments, which is not repeated to avoid repetition.

With the terminal 500 provided by embodiments of the present disclosure, it may be implemented that the terminal may determine the mode for transmitting the other SI request (such as msg1 and msg3) via the configuration information, which is pre-stored in the terminal or indicated by the base station. Therefore, the advantages of transmitting the other SI request using the msg1 and msg3 are given full play and the disadvantages brought out by single transmission mode may be effectively avoided.

Figure 6:
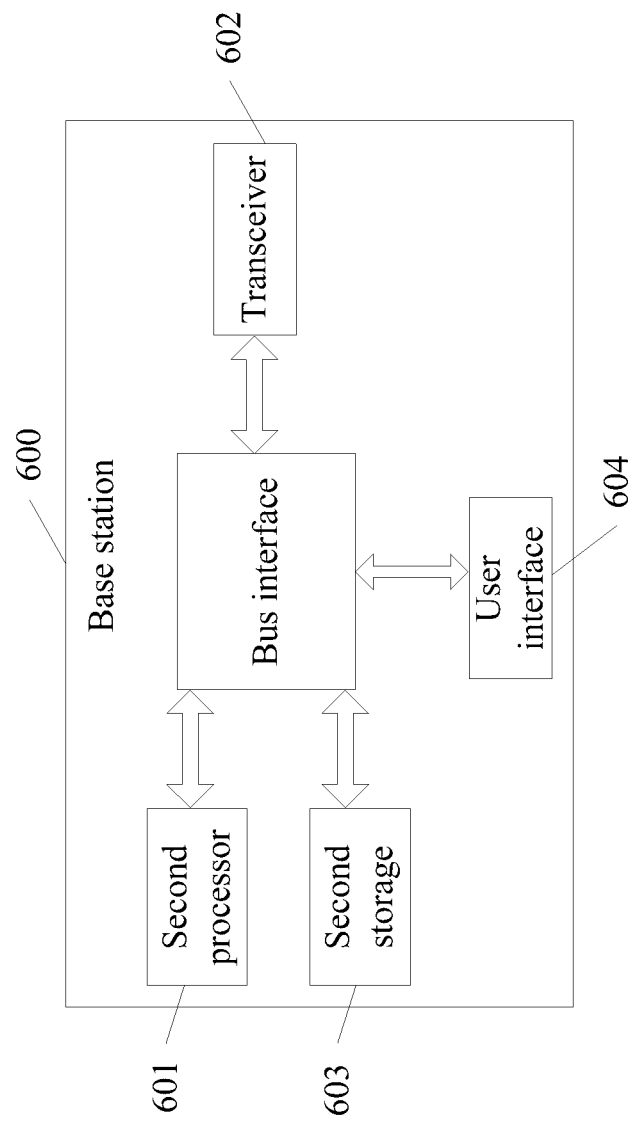
FIG. 6 is a diagram illustrating structure of a base station applied in an embodiment of the present disclosure.

FIG. 6 is a schematic diagram illustrating structure of a base station applied in embodiments of the present disclosure. As shown in FIG. 6, the base station 600 includes: a second processor 601, a transceiver 602, a second storage 603, a user interface 604 and a bus interface.

The second storage 603 is configured to store computer executable instructions.

The second processor 601 is configured to execute stored computer executable instructions to execute the following processes:

transmitting configuration information to a terminal, where the configuration information is used to determine a mode used by the terminal to transmit an other SI request;

receiving the other SI request transmitted from the terminal;

in response to the other SI request, transmitting an other SI response to the terminal via a dedicated Radio Resource Control (RRC) message, where the other SI response carries the other SI requested by the terminal.

The other SI request is used to request at least one type of other SI and the transmission mode includes: transmitting the other SI request via the msg1 or msg3.

The configuration information is used to indicate associated information between identifying information of the other SI and the transmission mode thereof/or the associated information between identifying information of an other SI combination and the transmission mode thereof, the other SI combination includes at least two types of other SI.

The minimum SI is transmitted to the terminal via the broadcast signaling. The minimum SI includes the associated information.

The configuration information is used to determine the transmission mode used by the terminal to transmit the other SI request.

In FIG. 6, the bus architecture can include any number of interconnected bus and bridge. Specifically, various circuits of one or more second processors 601, which are represented by the second processor 601, and one or more second storages, which are represented by the second storage 603, are linked together. The bus architecture may link various other circuits, such as a peripheral device, voltage regulator and a power management circuit together. These features are well known in this field, therefore, this disclosure does not make further description on these features. The bus interface provides an interface. The transceiver 602 can be multiple elements, including a transmitter and a receiver and provide units, which communicate with other devices on the transmission medium. As for different user devices, the user interface 604 may be an interface, which is able to externally and internally connect to needed devices. The connected devices include but are not limited to a small keyboard, a display, a speaker, a microphone, and a joystick, etc.

The second processor 601 is responsible for managing bus architecture and general processing. The second storage 603 may store data used by the second processor 601 when executing operations.

It should be noted that the user interface 604 in FIG. 6 may be an optional module. That is, in the implementation process, the user interface may be omitted and is not configured.

In the base station 600 in embodiments of the present disclosure, with the configuration information, which is pre-stored in the terminal or indicated in the base station, the terminal may determine the mode for transmitting the other SI request (such as, msg1 and msg3). Therefore, the advantages of transmitting the other SI request using the msg1 and msg3 are given full play and the disadvantages brought out by single transmission mode may be effectively avoided.

It should be noted that the description of the above terminal embodiments or base station embodiments are similar to that of the method embodiments. Beneficial effects of the device and system embodiments are similar to those of the method embodiments. For technical details not disclosed in the device or system embodiments of the present disclosure, please refer to the description of method embodiments of the present disclosure for understanding.

It should be understood that "one embodiment" mentioned in the description means that specific characteristics, structure or features related to the embodiments are included in at least one embodiment of the present disclosure. Therefore, the appearances of the phrase "in one embodiment" in various places of the specification may or may not be all referring to the same embodiment. Further, these specific characteristics, structure or features can be combined in one or more embodiments in any appropriate manner. It should be understood that in various embodiments of the present disclosure, the sequence number of the above processes does not mean the sequence of execution, and the sequence of execution of each process is determined by its function and internal logic. The sequence number of the said disclosed embodiments does not limit the implementation process of the said disclosed embodiments. The sequence number of the embodiments of the present disclosure is for the purpose of description and does not represent the advantages and disadvantages of the embodiments.

It should be noted that, in the present disclosure, the term of "include", "comprise" or any variation thereof is intended to cover a non-exclusive contain. Therefore, processes, methods, materials and devices, which include a series of elements, not only include the elements, but also include other elements, which are not listed, or further include inherent elements of the processes, methods, materials and devices. In the absence of more restrictions, the elements defined by a statement "includes one . . . " do not exclude that the processes, methods, materials and devices, which include these elements, also include additional same elements.

In several embodiments provided in the present disclosure, it should be noted that the disclosed devices and methods may be implemented via other modes. The device embodiments described above are only schematic. For example, the division of the units is only the division of the logic function. In actual implementation, additional division mode may exist, such as multiple units or components may be combined, integrated into another system, or some characteristics may be omitted or not executed. In addition, mutual coupling, direct coupling or communication connection among each displayed or discussed elements may be implemented via indirect coupling or communication connection between some interfaces, devices or units, such as electrical, mechanical, or otherwise.

The units described above as separation units may or may not be physically separated, and the components displayed as the units may or may not be the physical units. The units can be located in one place or distributed to multiple network units. Some or all of the units may be selected according to actual needs to realize the purpose of the embodiments.

In addition, each functional unit in the embodiments of the present disclosure can be integrated into one processing unit, or each unit can be separately used as a unit, or two or more units can be integrated into one unit. The above integrated units can be implemented in the form of hardware or hardware and software function units.

It can be understood by those skilled in that art that all or part of the steps to realize the above method embodiments can be completed by the hardware related to the program instructions. The programs can be stored in the computer-readable storage medium. When the programs are executed, steps in the above method embodiments are executed. The storage medium includes various kinds of mediums, which may store the programs, such as a mobile storage device, a Read Only Memory (ROM), a disk, or CD-ROM, etc.

Alternatively, the above integrated units in embodiments of the present disclosure, which are implemented in the form of software functional modules and are sold and used as independent products, can be stored in a computer-readable storage medium. On the basis of such an understanding, the technical scheme in essence or those contributing to the existing technology in embodiments of the present disclosure can be embodied in the form of software products. The computer software product is stored in a storage medium, including several instructions to enable a computer device (which can be a personal computer, server, or network-side device, etc.) to perform all or partial of the method in each embodiment of the present disclosure. The aforesaid storage medium includes various kinds of mediums which may store the program codes, such as, a mobile storage device, a read-only Memory (ROM), a disk or disc.

As stated above, the foregoing only describes specific embodiments of the present disclosure. However, the protection scope of the present disclosure is not limited to the specific embodiments. Any changes or replacements, which can be easily thought of by technical personnel familiar with the technical field, are covered by the protection scope of the present disclosure. Therefore, the protection scope of the present disclosure shall be subject to the protection scope of the claims.

What is claimed is:

1. A method for transmitting System Information (SI), applied to a terminal, comprising:
   determining a transmission mode of using which of random access message 1 (msg1) and random access message 3 (msg3) to transmit an other SI request according to configuration information, which is pre-stored by the terminal or configured by a base station, when the terminal transmits the other SI request;
   wherein the configuration information is configured to determine the transmission mode used by the terminal to transmit the other SI request;
   and transmitting the other SI request to the base station according to the transmission mode;
   wherein the other SI request is configured to request for at least one type of other SI;
   wherein the configuration information is configured to indicate at least one of associated information between identifying information of the other SI and a transmission mode of the other SI, or associated information between identifying information of an other SI combination and a transmission mode of the other SI combination; and the other SI combination includes at least two types of other SI;
   wherein the other SI request is a request for obtaining system information other than minimum SI which is periodically broadcasted.

2. The method according to claim 1, wherein before determining the transmission mode of using which of msg1 and msg3 to transmit the other SI request according to the configuration information configured by the base station, the method further comprises:
   receiving the configuration information transmitted from the base station.

3. The method according to claim 1, wherein determining the transmission mode of using which of msg1 and msg3 to transmit the other SI request according to the configuration information, which is pre-stored by the terminal or configured by the base station, comprises:
   searching the associated information for the transmission mode according to the identifying information of the other SI or the identifying information of the other SI combination in the configuration information.

4. The method according to claim 2, wherein receiving the configuration information transmitted from the base station, comprises:
   receiving, in a state transition procedure, a Radio Resource Control (RRC) message carrying the configuration information transmitted from the base station.

5. The method according to claim 4, wherein the state transition procedure comprises: a procedure of transiting from a connected state or inactive state to an idle state, or a procedure of transiting from the connected state to the inactive state.

6. The method according to claim 1, wherein after transmitting the other SI request to the base station according to the transmission mode, the method further comprises:
   when the transmission mode is transmitting the other SI request via the msg1, receiving an other SI response transmitted from the base station via broadcast signaling according to resources indicated by the base station;
   when the transmission mode is transmitting the other SI request via the msg3, receiving the other SI response transmitted from the base station via dedicated signaling according to the resources indicated by the base station;
   the other SI response carries the other SI requested by the terminal.

7. The method according to claim 6, wherein the configuration information further comprises: resources for the terminal to receive the other SI;
   receiving the other SI response transmitted from the base station via the broadcast signaling according to the resources indicated by the base station and receiving the other SI response transmitted from the base station via the dedicated signaling according to the resources indicated by the base station respectively, comprises:
   receiving the other SI response transmitted from the base station according to resources of the other SI indicated in the configuration information.

8. The method according to claim 1, wherein before determining the transmission mode of using which of msg1 and msg3 to transmit the other SI request according to the configuration information pre-stored by the terminal, the method further comprises: classifying the other SI into other SI of a first type and other SI of a second type; wherein the other SI of the first type and the other SI of the second type respectively correspond to different transmission modes.

9. The method according to claim 8, wherein classifying the other SI into the other SI of the first type and the other SI of the second type, comprises:
   determining a transmission frequency of the other SI;
   classifying the other SI, based on transmission frequency of which is larger than a preset frequency threshold, into the other SI of the first type, and classifying the other SI, based on transmission frequency of which is less than or equals to the frequency threshold, into the other SI of the second type;
   respectively setting corresponding transmission modes for the other SI of the first type and the other SI of the second type; and
   generating the associated information according a corresponding relationship between the other SI of the first type and the set transmission mode, and a corresponding relationship between the other SI of the second type and the set transmission mode.

10. The method according to claim 1, wherein receiving the configuration information transmitted from the base station comprises: receiving the associated information transmitted from the base station via broadcast signaling.

11. The method according to claim 10, wherein receiving the configuration information transmitted from the base station, comprises: receiving minimum SI transmitted from the base station via broadcast signaling, wherein the minimum SI includes the associated information.

12. A device for transmitting System Information (SI), comprising:
   a processor, a storage and computer programs, which are stored in the storage and run on the processor, wherein the processor executes the computer programs to perform the method according to claim 1.

13. A non-transitory computer readable storage medium, wherein the non-transitory computer readable storage medium stores computer programs which are executed by a processor to perform the method according to claim 1.

14. A method for transmitting System Information (SI), applied to a base station, comprising:
   transmitting configuration information to a terminal, wherein the configuration information is configured to determine a transmission mode of using, by the terminal, which of random access message 1 (msg1) and random access message 3 (msg3) to transmit to transmit an other SI request;
   receiving the other SI request transmitted from the terminal;
   in response to the other SI request, transmitting an other SI response to the terminal via a dedicated Radio Resource Control (RRC) message or a broadcast message to the terminal, wherein the other SI response carries the other SI requested by the terminal;
   wherein the other SI request is configured to request at least one type of other SI;
   wherein the configuration information is configured to indicate at least one of: associated information between identifying information of the other SI and the transmission mode of the other SI, or associated information between identifying information of an other SI combination and the transmission mode of the other SI combination, the other SI combination includes at least two types of other SI;
   wherein the other SI request is a request for obtaining system information other than minimum SI which is periodically broadcasted.

15. The method according to claim 14, wherein transmitting the configuration information to the terminal, comprises:
   transmitting minimum SI to the terminal via a broadcast signaling; wherein the minimum SI includes the associated information.

16. A device for transmitting System Information (SI), comprising:
   a processor, a storage and computer programs, which are stored in the storage and run on the processor, wherein the processor executes the computer programs to perform the method according to claim 14.

* * * * *